United States Patent [19]

Payne

[11] Patent Number: 4,692,596
[45] Date of Patent: Sep. 8, 1987

[54] POWER CONTROL ARRANGEMENT FOR AUTOMATIC SURFACE UNIT

[75] Inventor: Thomas R. Payne, Louisville, Ky.

[73] Assignee: General Electric Company, Louisville, Ky.

[21] Appl. No.: 816,616

[22] Filed: Jan. 6, 1986

[51] Int. Cl.$^4$ ............................................. H05B 1/02
[52] U.S. Cl. .................................... 219/450; 219/449; 219/494
[58] Field of Search ............... 219/450, 448, 449, 494, 219/452, 453, 551, 445, 446, 447, 459, 489, 492, 518; 236/20 A; 126/374, 39 G

[56] References Cited

U.S. PATENT DOCUMENTS

| | | | |
|---|---|---|---|
| 2,260,840 | 10/1941 | Rowe | 219/494 |
| 2,767,293 | 10/1956 | Jordan et al. | 219/489 |
| 2,838,645 | 6/1958 | Welch | 219/452 |
| 3,118,044 | 1/1964 | Holtkamp | 219/450 |
| 3,819,906 | 6/1974 | Gould, Jr. | 219/506 |
| 3,858,141 | 12/1974 | Lackey | 219/492 |
| 3,937,921 | 2/1976 | Furuichi | 219/489 |
| 4,214,150 | 7/1980 | Cunningham | 219/452 |
| 4,217,481 | 8/1980 | Fischer | 219/450 |
| 4,241,289 | 12/1980 | Bowling | 219/450 |
| 4,334,145 | 6/1982 | Norris, Sr. | 219/453 |
| 4,334,147 | 6/1982 | Payne | 219/492 |
| 4,394,565 | 7/1983 | Dills | 219/452 |
| 4,449,032 | 5/1984 | Frerking | 219/494 |
| 4,465,228 | 8/1984 | Mori et al. | 236/20 A |
| 4,492,336 | 1/1985 | Takata et al. | 236/20 A |

FOREIGN PATENT DOCUMENTS 57-103515  6/1982  Japan .................................. 219/492

OTHER PUBLICATIONS

Technical Paper—Presented to ASME by A. Myklebust et al.—"Microcomputer Control of a Residential Range Top for Energy Conservation—Aug. 1982.
Technical Paper—International Appliance Technical Conf.—May 1983—Terai et al., "Boiling Point Detector for Surface Cooking Unit"—pp. 421-440.

Primary Examiner—E. A. Goldberg
Assistant Examiner—Teresa J. Walberg
Attorney, Agent, or Firm—H. Neil Houser; Radford M. Reams

[57] ABSTRACT

An improved electronic power control arrangement for a cooking appliance equipped with an automatic surface unit operable in a Fry Mode to heat a utensil to a steady state temperature range corresponding to the temperature setting selected by the user. Two error signals are established by the electronic controller as functions of the difference between the user selected temperature and the sensed utensil temperature. The controller controls energization of the automatic surface unit as a function of the first error signal during the heat-up phase to rapidly bring the sensed utensil temperature to the selected steady state temperature range and as a function of the second relatively larger error signal during operation in the steady state phase to rapidly return the sensed utensil temperature to the selected range if it should drop below the selected range during steady state operation.

7 Claims, 14 Drawing Figures

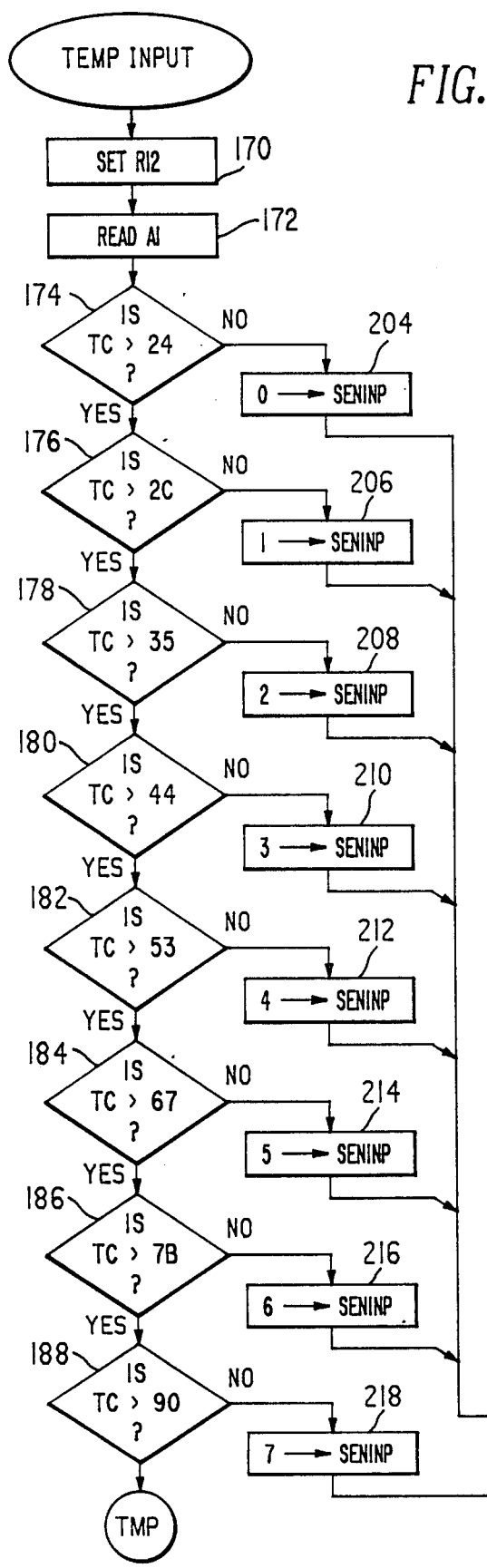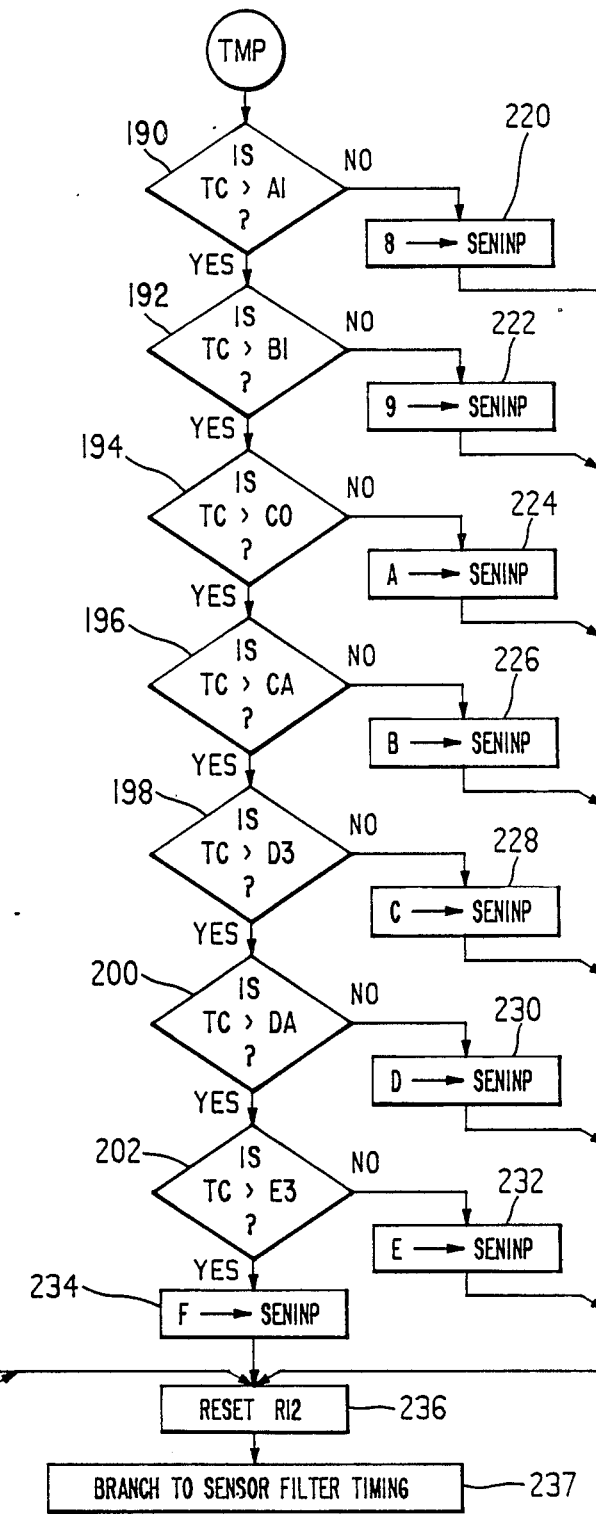
FIG. 7

POWER CONTROL ARRANGEMENT FOR AUTOMATIC SURFACE UNIT

BACKGROUND OF THE INVENTION

This invention relates generally to an improved power control arrangement for an automatic surface unit in a cooking appliance such as a domestic electric range. More specifically, this invention is an improvement to the power control arrangement disclosed and claimed in commonly assigned U.S. Pat. No. 4,493,980 to Thomas R. Payne, the specification of which is hereby incorporated by reference.

The electronic control arrangement of the above referenced patent provides a significant improvement in the temperature control performance of automatic surface units over the conventional electromechanical sensing and control devices conventionally used for such surface units. In that control arrangement the applied power level for the surface unit is adjusted as a function of an error signal which is directly proportional to the difference between the selected utensil temperatures range and the sensed utensil temperature range. This error signal is large early in the transient heat up phase when the differential is large resulting in a relatively high applied power level and goes to zero as the differential goes to zero with the applied power level diminishing accordingly. Consequently, the unit is greatly overdriven initially to heat up the utensil rapidly, but only slightly so as the sensed temperature approaches the selected steady state temperature range to minimize overshoot. This arrangement works well for relatively small and average thermal loads. However, for relatively large thermal loads, during steady state operation, that is operation after having initially reached the selected steady state temperature range, the utensil temperature may drop below the desired minimum steady state temperature, a condition referred to as undershoot. When such conditions occur the error signal at least initially is relatively small, and consequently the applied power level for the surface unit is such that utensil temperature may be undesirably slow in returning to the selected range.

Therefore, it is an object of the present invention to provide an improved power control arrangement which will retain the rapid thermal response with minimum overshoot during the transient heat up phase provided by the arrangement of the '980 patent, yet which will provide a more rapid thermal response to undershoot conditions occurring during operation in the steady state phase.

SUMMARY OF THE INVENTION

The present invention provides an improved power control arrangement for a cooking appliance incorporating an automatic surface unit for which the user may select a FRY mode for heating food loads to one of a plurality of user selectable steady state temperature ranges. The automatic surface unit includes temperature sensing means for sensing the temperature of a cooking utensil being heated on the surface unit. User operable selector means are provided, enabling the user to select one of a plurality of different temperature settings for the FRY mode, each setting having associated with it a predetermined steady state temperature range defined by a predetermined minimum and maximum sensed utensil temperature. Electronic control means controls energization of the surface unit in response to inputs from the temperature sensing means and the user input selector means. In accordance with the improvement of the present invention, the control means is operative in the FRY mode to generate first and second error signals, as functions of the difference between the sensed utensil temperature and the steady state temperature range for the selected heat setting. The control means operates the surface unit at an applied power level determined as a function of the first error signal during the transient heat up phase, prior to the sensed utensil temperature first reaching the selected steady temperature range, and operates the surface unit at an applied power level which is determined as a function of the second error signal during operation in the steady state phase after the sensed utensil temperature has first reached the selected steady utensil temperature range. The second error signal is larger than the first error signal whereby undershoot conditions occurring during the steady state phase such as may result from a relatively large thermal load are corrected rapidly.

While the novel features of the invention are set forth with particularity in the appended claims, the invention, both as to organization and content, will be better understood and appreciated from the following detailed description taken in conjunction with the drawings.

BRIEF DESCRIPTION OF THE DRAWINGS

FIG. 7 is a flow diagram of the Temperature Scan routine incorporated in the control program for the microprocessor in the circuit of FIG. 5;

DETAILED DESCRIPTION OF THE ILLUSTRATIVE EMBODIMENT

Figures 1, 2, 3A, 3B:
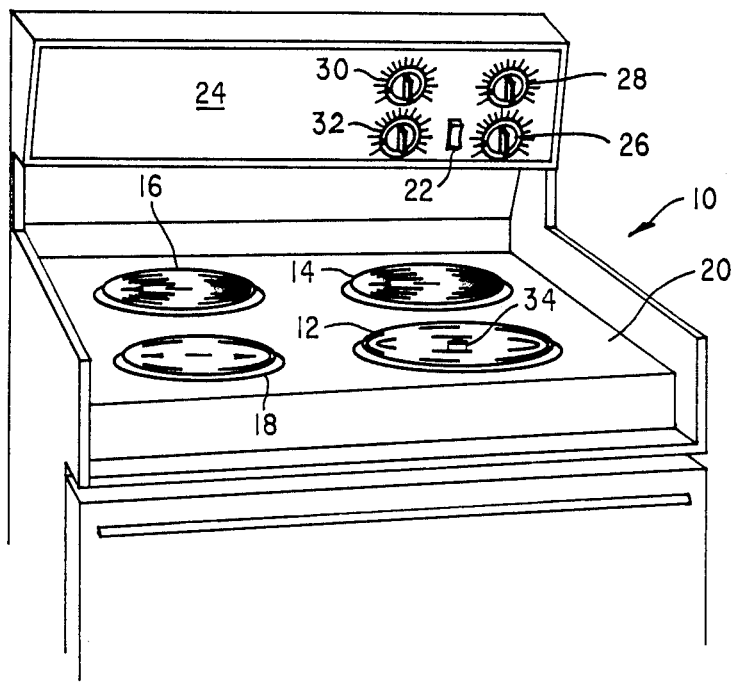
FIG. 1 is a front perspective view of a portion of an electric range illustratively embodying the power control arrangement of the present invention.
FIG. 2 is a greatly enlarged view of a portion of the control panel of the range of FIG. 1 showing the details of one of the control knobs thereof.
FIG. 3A is a sectional side view of a surface unit of the type incorporated in the range of FIG. 1 showing the temperature sensor.
FIG. 3B is a graphic representation of the resistance vs. temperature characteristic for the temperature sensor of FIG. 2A.

FIG. 1 illustrates an electric range 10 incorporating a control arrangement illustratively embodying the present invention. Range 10 includes four conventional electric surface units comprising resistive heating elements 12, 14, 16 and 18 supported from a substantially horizontal support surface 20. Each of elements 12-18 are adapted to support cooking utensils, such as frying pans, sauce pans, tea kettles, etc., placed thereon for heating. Heating element 12 is arranged to function as an automatic surface unit, that is, energization of element 12 is automatically controlled as a function of the sensed temperature of the utensil being heated thereon and the user selected heat setting. Heating elements 14, 16 and 18 may be arranged to be duty cycle controlled in conventional manner to provide a predetermined output power level corresponding to the user selected heat setting. While, as is common practice, the range of the illustrative embodiment is provided with only one automatic surface unit, it will be appreciated that multiple automatic surface units could be provided.

Mode selection switch 22 on control panel 24 enables the user to select the Fry Mode or the general Boil Mode for heating element 12. Manually operable rotary control knobs 26, 28, 30 and 32 are mounted to control panel 24. Control knob 26 is illustrated in greater detail in FIG. 2. Control knob 26 enables the user to select a plurality of heat settings corresponding to various cooking temperatures for the Fry Mode, and to select Warm, Simmer and Lo, Med and Hi Boil Modes for the general Boil mode.

The utensil temperature sensing arrangement employed with the automatic surface unit in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs. temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
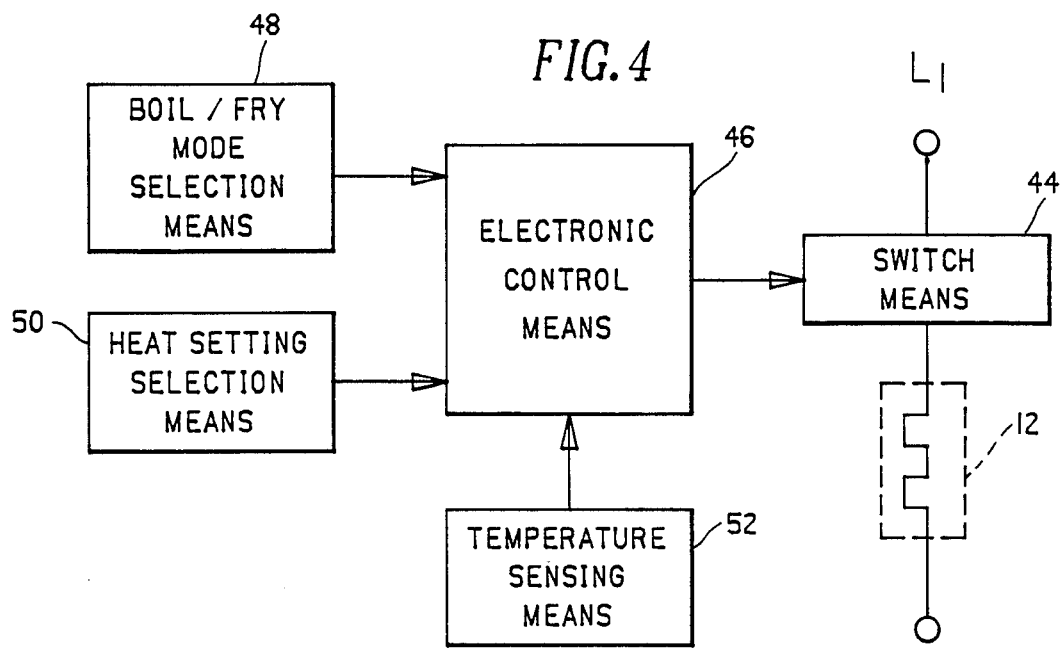
FIG. 4 is a greatly simplified functional block diagram of the control arrangement employed in the range of FIG. 1 incorporating the power control arrangement of the present invention.

A generalized functional block diagram of the control arrangement for automatic surface unit 12 of range 10 is shown in FIG. 4. Heating element 12 is energized by a standard 60 Hz AC power signal which can be either 120 or 240 volts supplied to terminals L1 and L2. Power to element 12 is controlled by switch means 44. The switching device of switch means 44 is switched into and out of conduction by control signals generated by electronic control means 46.

Electronic control means 46 generates power control signals for element 12 in response to inputs from the user operable input selection means 48 and 50 signifying mode and heat setting selections respectively and inputs from temperature sensing means 52 which senses the temperature of the utensil being heated by element 12.

In the illustrative embodiment, electronic control means 46 controls the output power level of heating element 12 by controlling the duty cycle, i.e., the percentage of time power is applied to the heating element. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to a time period of approximately 4 seconds. The selected duration for the control interval and control period provide a satisfactory range of heat settings for desired cooking performance and can be programmed to make efficient use of microprocessor memory. It is understood, however, that control intervals and control periods of greater and lesser duration could be similarly employed.

TABLE I

| Power Level | % On Time | On Control Intervals Per Control Period | Hex Rep M(KB) |
|---|---|---|---|
| OFF | 0 | 0 | 0 |
| 1 | 3 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

Electronic control means 46 selectively implements one of sixteen different duty cycle power levels, including a zero duty cycle or OFF level. Table I shows the percentage ON time, i.e. the duty cycle and the number of conductive control intervals per control period for each of the available power levels.

Only the Fry mode, which is the mode implemented by the improved control arrangement of the present invention, will be described herein. A power control arrangement implementing the Boil mode is described and claimed in commonly assigned hereinbefore referenced U.S. Patent 4,493,980.

The Fry Mode is intended to rapidly bring the temperature of the utensil to the selected relatively narrow operating temperature range while avoiding extensive temperature overshoots and undershoots which can adversely affect cooking performance. Relatively tight control over the steady state operating temperature of the heating element is desired in the heating of a wide variety of food loads. To this end, a relatively narrow steady state temperature range is provided for each of the Fry Mode heat settings. The temperature range associated with each heat setting for the Fry Mode in the illustrative embodiment is shown in Table II.

The user selects the Fry Mode by manipulation of mode switch 22. To facilitate rapid thermal response to an increase in heat setting, either from OFF or from a previously selected heat setting, the heating element is operated at a transient power level determined by the electronic control means as a function of the difference between the steady state temperature range and the sensed utensil temperature when the sensed utensil temperature is less than the steady state temperature range for the selected heat setting.

The power level applied to the heating element exceeds the steady state power level for the selected heat setting by a number of power levels, which number of levels is a function of the difference between the sensed utensil temperature and the steady state temperature range for the selected heat setting. As the temperature difference approaches zero, the applied power level approaches the steady state level. By operating the heating element at relatively high power levels when the difference between the desired temperature range and the sensed utensil temperature is large, the utensil temperature increases rapidly. By operating the heating element at power levels which decrease toward the steady state level as the sensed temperature increases toward the desired temperature range, the desired rapid thermal response is achieved with minimal temperature overshoot. For steady state operation each Fry Mode heat setting has associated with it a steay state duty cycle or power level which is intended to maintain typically loaded cooking utensils within the corresponding steady state temperature range following the transient heat-up period. When the sensed utensil temperature exceeds the steady state temperature range the heating element is de-energized.

The control arrangement described thus far is the control arrangement of the hereinbefore referenced 4,493,980 patent. The control arrangement provides very satisfactory transient heat up phase performance for all types of thermal loads. Loads are brought to the selected state temperature rapidly with minimal overshoot. However, it will be recalled that an object of the present invention is to provide improved temperature control when operating in the steady state phase while retaining the highly satisfactory performance in the transient phase. A problem particularly with large thermal loads such as large, heavily loaded utensils is that the utensil temperature tends to undershoot, that is drop below the selected steady state temperature range, because the normal steady state power level is insufficient to maintain the utensil temperature within the selected steady state range. When the power level is adjusted in the same manner as during the transient heat up phase, an undesirably slow response results.

More specifically, in the control arrangement of the 4,493,980 patent an error signal is established as a function of the temperature differential. The power level is then increased as a function of this error signal. However, the increase may not be enough to return the utensil temperaturae to the desired steady state range as quickly as desired. The improvement of the present invention contemplates establishing a second error signal as a different function of the temperature differential, which weighs the differential more heavily resulting in a greater increase in the power level upon the occurrence of an undershoot condition after the steady state temperature range has initially been reached. This second error signal is employed in lieu of the first in adjusting the power level during operation in the steady state operating phase. In a preferred form of the invention the error signal is at least a factor of two larger than the first error signal and is preferably further increased by two power levels. An error signal of this relative magnitude, if used during the transient heat up phase, could result in an undesirably large overshoot. However, it has been empirically determined that when this larger error signal is employed in the steady state phase with the range of the illustrative embodiment, the utensil temperature is rapidly returned to the selected range without overshoot. The means for implementing this arrangement in the control of the range of the illustrative embodiment is hereinafter described with reference to the control program flow diagrams.

TABLE II

| | Fry Mode | | |
|---|---|---|---|
| Hexadecimal Representation of Setting (KB) | Selected Heat Setting | Steady State Utensil Temp. Range °F. | Steady State Power Level M(KB) |
| 0 | OFF | — | 0 |
| 1 | Wm | 116–140 | 2 |
| 2 | Wm | 116–140 | 3 |
| 3 | 150 | 141–165 | 5 |
| 4 | 175 | 166–190 | 6 |
| 5 | 200 | 191–215 | 7 |
| 6 | 225 | 216–240 | 8 |
| 7 | 250 | 241–265 | 8 |
| 8 | 275 | 266–290 | 9 |
| 9 | 300 | 291–315 | A |
| A | 325 | 316–340 | B |
| B | 350 | 341–365 | B |
| C | 375 | 366–390 | C |
| D | 400 | 391–415 | D |
| E | 425 | 416–440 | D |
| F | 450 | 441–465 | D |

Circuit Description

Figure 5:
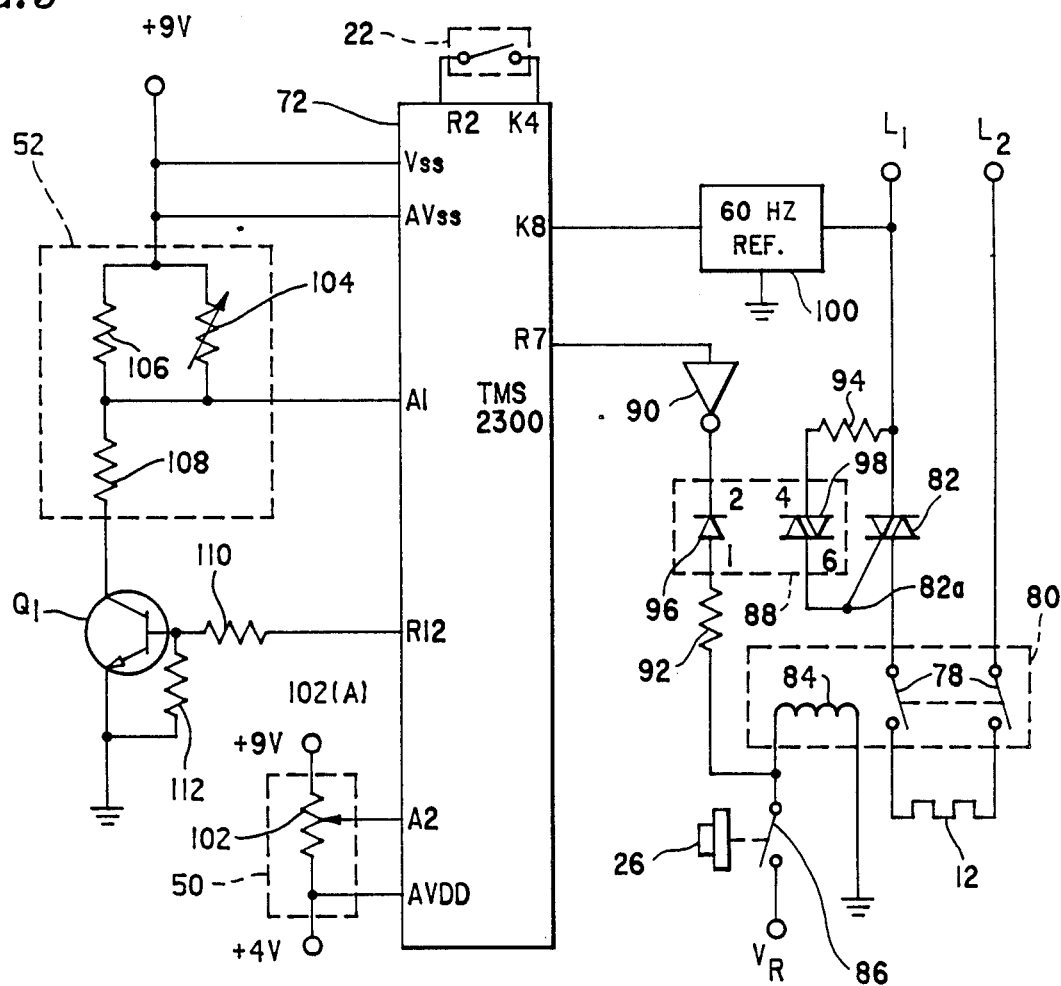
FIG. 5 is a simplified schematic diagram of the control circuit illustratively embodying the power control arrangement of the present invention as used in the range of FIG. 1.

A control circuit illustratively implementing the improved power control arrangement of the present invention is represented in simplified schematic form in FIG. 5. Power to heating element 12 is provided by application of a standard 60 Hz AC power signal of either 120 or 240 volts across terminals L1 and L2. Heating element 12 is connected across lines L1 and L2 via normally open relay contacts 78 of ON/OFF relay 80 and power control triac 82. Coil 84 of ON/OFF relay 80 is serially connected between DC reference voltage supply $V_R$ 1 and system ground via ON/OFF switch 86. Switch 86 is mechanically coupled in conventional manner (illustrated schematically) to control knob 26 such that switch 86 is in its open position when control knob 26 is in its OFF position. Movement of control knob 26 from its OFF position places switch 86 in its closed position, energizing coil 84 which in turn closes associated contacts 78 thereby enabling power control triac 82 to control energization of heating element 12.

Microprocessor 72 controls the switching of power control triac 82 by trigger signals provided at output port R7. The trigger signal at R7 is coupled to pin 2 of opto-isolator device 88 via inverting buffer amplifier 90. Pin 1 of opto-isolator 88 is coupled to DC reference voltage supply V hd R 1 via current limiting resistor 92 and switch 86. The output return pin 4 of opto-isolator 88 is coupled to power line L2 via current limiting resistor 94. Pin 6 is coupled to the gate terminal 82A of power control triac 82 which is connected in series with heating element 12. The trigger signal at R7 is inverted by amplifier 90 forward biasing light emitting diode 96 of opto-isolator 88 which in turn switches the bi-polar switch portion 98 of opto-isolator 88 into conduction to apply a gate signal to power control triac 82 switching it into conduction.

A 60 Hz pulse train is generated by conventional zero crossing detector circuit 100 coupled between L1 and input port K8 of microprocessor 72 to facilitate sychronization of triac triggering and other control system operations with zero crossings of the 60 Hz AC power signal applied across L1 and L2.

Utensil temperature inputs are provided to microprocessor 72 via temperature sensing means 52 comprising a thermistor device 104 connected in parallel with linearizing precision resistor 106 and in series with precision resistor 108 forming a voltage divider network energized by a regulated +9 volt dc voltage supply. The divider network is coupled to ground through transistor Q1. The junction of thermistor 104 and resistor 108 is coupled to microprocessor input port A1. The analog voltage at this point is proportional to the temperature sensed by the thermistor. Microprocessor 72 has an interval 8-bit A/D converter which operates between voltage rails AVSS and AVDD which are set at 9 volts DC and 4 volts DC respectively by regulated voltage sources connected to input ports AVSS and AVDD of microprocessor 72, to provide a 5 volt voltage swing. The internal A/D converter measures the input voltage signal at A1 and converts this signal to a corresponding digital value. Table III lists representative values of the thermistor resistance, and corresponding temperature and analog voltage values. Also shown in Table III is the Hexadecimal representation of the corresponding 8 bit binary code resulting from the A/D conversion of the analog voltage values.

Transistor Q and biasing resistors 110 and 112 function as a disabling circuit. Output port R12 of microprocessor 72 is coupled to the base of Q1 via resistor 110. Resistor 112 is connected between the emitter and the base of transistor Q1. The function of the disabling circuit is to only allow current flow through thermistor 104 when temperature measurements are being made. To this end, microprocessor 72 sets output R12 causing a positive voltage to be applied to the base of Q1 via resistor 110 switching Q1 into conduction. After the temperature input is obtained, R12 is reset rendering Q1 and thermistor 104 non-conductive.

TABLE III

| Temperature °F. | Resistance (Ω) | Analog Volts | Hex Rep |
|---|---|---|---|
| 115 | 22,000 | 4.71 | 24 |
| 140 | 11,500 | 4.86 | 2C |
| 165 | 7,600 | 5.04 | 35 |
| 190 | 5,000 | 5.33 | 44 |
| 215 | 3,300 | 5.63 | 53 |
| 240 | 2,100 | 6.02 | 67 |
| 265 | 1,500 | 6.41 | 7B |
| 290 | 1,050 | 6.82 | 90 |
| 315 | 740 | 7.16 | A1 |
| 340 | 560 | 7.47 | B1 |
| 365 | 410 | 7.77 | C0 |
| 390 | 320 | 7.96 | CA |
| 415 | 250 | 8.14 | D3 |
| 440 | 200 | 8.27 | DA |

TABLE III-continued

| Temperature °F. | Resistance (Ω) | Analog Volts | Hex Rep |
|---|---|---|---|
| 465 | 150 | 8.45 | E3 |

User inputs are provided to microprocessor 72 via Boil/Fry Mode selection switch means 22 and heat setting selection means 50 comprising input potentiometer 102. Mode selection switch 22 is directly coupled between output port R2 and input port K4 of microprocessor 72. The open and closed states of switch 22 signify selection of the general Boil Mode and Fry Mode, respectively. Microprocessor 72 determines the state of switch 22 by periodically generating a logical high signal at R2 and monitoring the input signal at K4.

Input potentiometer 102 is coupled between regulated 9 volt dc and regulated 4 volt dc reference voltage supplies. Wiper arm 102A, coupled to A/D input port A2 of microprocessor 72, is positioned by user rotation of control knob 26. The voltage between the wiper arm and the 4 volt supply is an analog signal representing the selected heat setting. The internal A/D converter of microprocessor 72 described briefly above for processing the temperature inputs also processes analog voltages appearing at A2 representing the user input settings.

The processing of the resultant digitized temperature and power setting input signals will be described in conjunction with the following description of the control program.

The following component values are believed suitable for use in the circuit of FIG. 5. These values are illustrative only, and are not intended to limit the scope of the claimed invention.

| Fixed Resistors (Ω) | Transistor Q1 |
|---|---|
| 92 1K | 2N2222 |
| 94 220 | Integrated Circuits |
| 106 2.21K | 88 MDC 3020 Integrated Circuit |
| 108 2.21K | 90 ULN 2004A Integrated Circuit |
| 110 22K | Microprocessor |
| 112 27K | 72 Texas Instruments TMS 2300 |
| 117 10K | Triac |
| 119 10K | 82 General Electric SC 147 |
| Potentiometer (Ω) | Surface Unit |
| 102 50K | 12 General Electric WB 30 × 218 |
| Thermistor (Ω) | |
| 104 50K | |

Control Program Description

Microprocessor 72 is customized to perform control functions in accordance with this invention by permanently configuring the Read Only Memory (ROM) of microprocessor 72 to implement predetermined control instructions. FIGS. 6 through 12 are flow diagrams which illustrate the control routines incorporated in the control program of microprocessor 72 to perform the control functions in accordance with the present invention. From these diagrams one of ordinary skill in the programming art can prepare a set of control instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance. Instructions for carrying out the routines described in the diagrams may be interleaved with instructions and routines for other control functions which are not part of the present invention.

Figure 6:
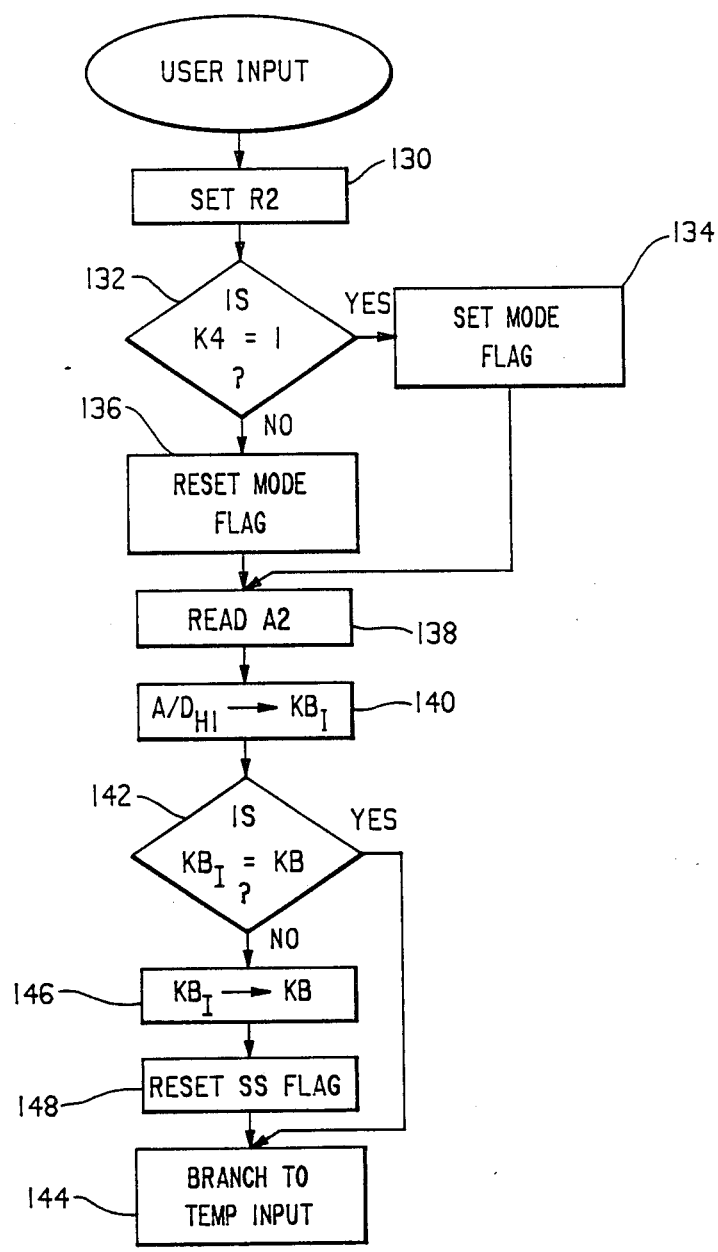
FIG. 6 is a flow diagram of the User Input Scan routine incorporated in the control program for the microprocessor in the circuit of FIG. 5.

USER INPUT Routine—FIG. 6

The function of this routine is to read in the user selected heat setting input signals at input port A2 (FIG. 5), and to determine whether Boil or Fry has been selected for the automatic surface unit.

The state of mode select switch 22 is determined by setting output R2 (Block 130). Inquiry 132 then scans input port K4 to determine whether switch 22 is open (K4=0) or closed (K4=1). If K4=1, signifying selection of the Fry Mode, a Mode Flag is set for future reference in a subsequent routine (Block 134). If K4=0, signifying selection of the Boil Mode, the Mode Flag is reset (Block 136).

It will be recalled that there are 16 possible heat settings, each represented by a corresponding digital signal. The internal A/D conversion routine provided in microprocessor 72 will convert the analog voltage at pin A2 to an eight bit digital code capable of establishing 256 levels. Sixteen wiper arm positions corresponding to 16 power settings are evenly spaced along the potentiometer. By this arrangement the user selected input setting may conveniently be represented by the four high order bits of the 8 bits A/D output signal. The analog input at pin A2 is read in (Block 138) and converted to its corresponding digital signal. The four high order bits of this signal designated A/D HI are stored as the new input power setting variable KB$_I$ (Block 140). Inquiry 142 compares the new input KB$_I$ with input variable KB representing the previously stored power setting read in during the previous pass through the program to detect a change in setting. If KB$_I$ equals KB signifying no change in power setting selection, the program branches (Block 144) to the Temp Input Routine (FIG. 7). If KB$_I$ differs from KB signifying a change in setting, the new setting is stored as KB (Block 146) and a flag designated the SS Flag utilized in the Fry routine is reset (Block 148). By this arrangement the SS Flag is reset in response to each change in power setting selection. The program then branches from the User Input routine to the Temp Input routine.

TEMP INPUT Routine—FIG. 7

The function of this routine is to convert the analog voltage at pin A1 representing the sensed utensil temperature to a digital signal representative of the sensed utensil temperature. More specifically, this routine determines within which of 15 predetermined temperature ranges the present sensed utensil temperature falls. A hexadecimal value is assigned to the variable SENINP (and also SENOUT) corresponding to the appropriate one of the 15 temperature ranges shown in Table IV. The hexadecimal value for the upper temperature threshold value for each temperature range is also included in Table IV.

TABLE IV

| Hex Rep SENINP & SENOUT | Temp. Range °F. | Hex Code Upper Threshold |
| --- | --- | --- |
| 0 | T ≦ 115 | 24 |
| 1 | 115 < T ≦ 140 | 2C |
| 2 | 140 < T ≦ 165 | 35 |
| 3 | 165 < T ≦ 190 | 44 |
| 4 | 190 < T ≦ 215 | 53 |
| 5 | 215 < T ≦ 240 | 67 |
| 6 | 240 < T ≦ 265 | 7B |
| 7 | 265 < T ≦ 290 | 90 |
| 8 | 290 < T ≦ 315 | A1 |
| 9 | 315 < T ≦ 340 | B1 |
| A | 340 < T ≦ 365 | C0 |
| B | 365 < T ≦ 390 | CA |
| C | 390 < T ≦ 415 | D3 |
| D | 415 < T ≦ 440 | DA |
| E | 440 < T ≦ 465 | E3 |
| F | 465 < T | |

Referring now to FIG. 7, R12 is set (Block 170) to turn on transistor Q1 (FIG. 5) thereby enabling energization of thermistor 104. Next the analog voltage representing the sensed temperature is read in and converted to its 8 bit digital representation (Block 172). The variable TC in the flow diagram represents the digital value of the analog signal. Inquiries 174–202 determine the temperature range in which the sensed temperature falls and Blocks 204–234 assign the appropriate value to the temperature variable SENINP in accordance with Tabel V. After establishing the appropriate value for SENINP, R12, is reset (Block 236) to turn off Q1, de-energizing thermistor 104, and the program branches (Block 237) to the Sensor Filter and Timing routine (FIG. 8).

Figure 8:
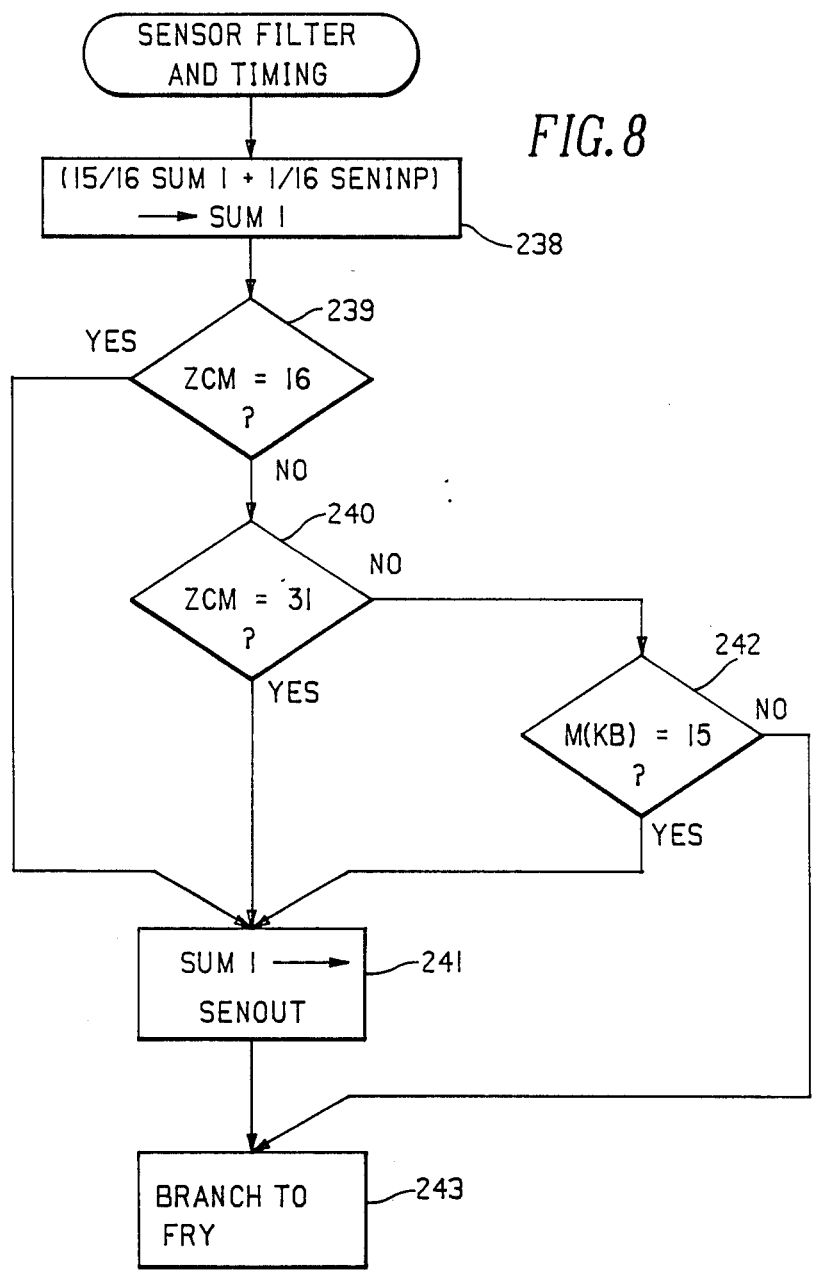
FIG. 8 is a flow diagram of the Sensor Filter and Timing routine incorporated in the control program for the microprocessor in the circuit of FIG. 5.

SENSOR FILTER and TIMING Routine—FIG. 8

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on themistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 8, the filter function is performed by Block 238. It will be recalled that SENINP is the hexadecimal representation of the temperature range for the sensed utensil temperature determined in the previously described TEMP INPUT routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

A counter designated the ZCM counter operates as a 32 count ring counter, counting from 0-31 and resetting to 0. In the duty cycle control implemented in the Power Compare and Power Out routine hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the eleven lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 8, Inquiries 239 and 240 look for ZCM counts of 16 and 31, respectively. Upon the occurrence of either count, SENOUT is updated by the then current value of SUM 1 (Block 241). Otherwise, Inquiry 242 checks to determine if the power level presently being implemented is the 100% power level (M(KB)=15). If it is, SENOUT is updated by SUM 1 (Block 241) regardless of the count; if not, Block 241 is bypassed, and SENOUT is not updated during this pass. In this fashion for power levels lower than 15, SENOUT is updated only on counts 16 and 31, and when power level 15 is being implemented SENOUT is updated every count. Upon completion of this routine the program branches (Block 243) to the Fry routine (FIG. 9).

Figure 9:
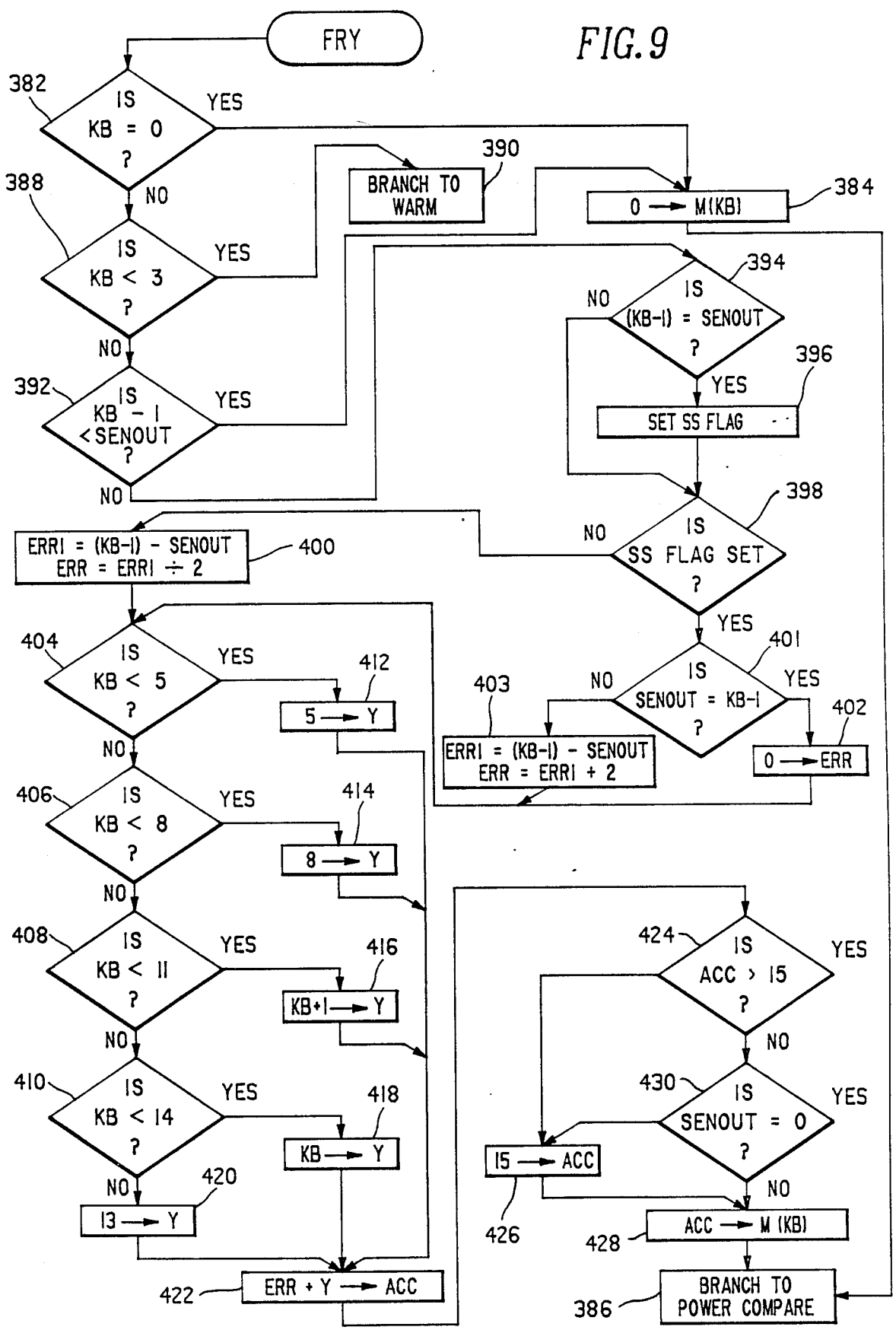
FIG. 9 is a flow diagram of the Fry routine incorporated in the control program of the microprocessor in the circuit of FIG. 5.

FRY Routine—FIG. 9

The function of this routine is to implement the Fry Mode. It will be recalled that in accordance with the present invention, the power level applied to the surface unit in the FRY Mode is established as a function of the selected temperature setting and a first error signal during the transient heat-up phase and as a function of the selected power level and a second error signal during operation in the steady state phase. The appropriate power level to be applied is established in this routine. A flag designated the SS Flag is used in this routine to indicate whether or not the sensed utensil has first reached the steady state temperature range for the selected temperature. The SS Flag is set on the first pass through this routine after the selected steady state range in reached. The SS Flag is reset in the previously described User Input routine in response to changes in the temperature selection.

Figure 11A:
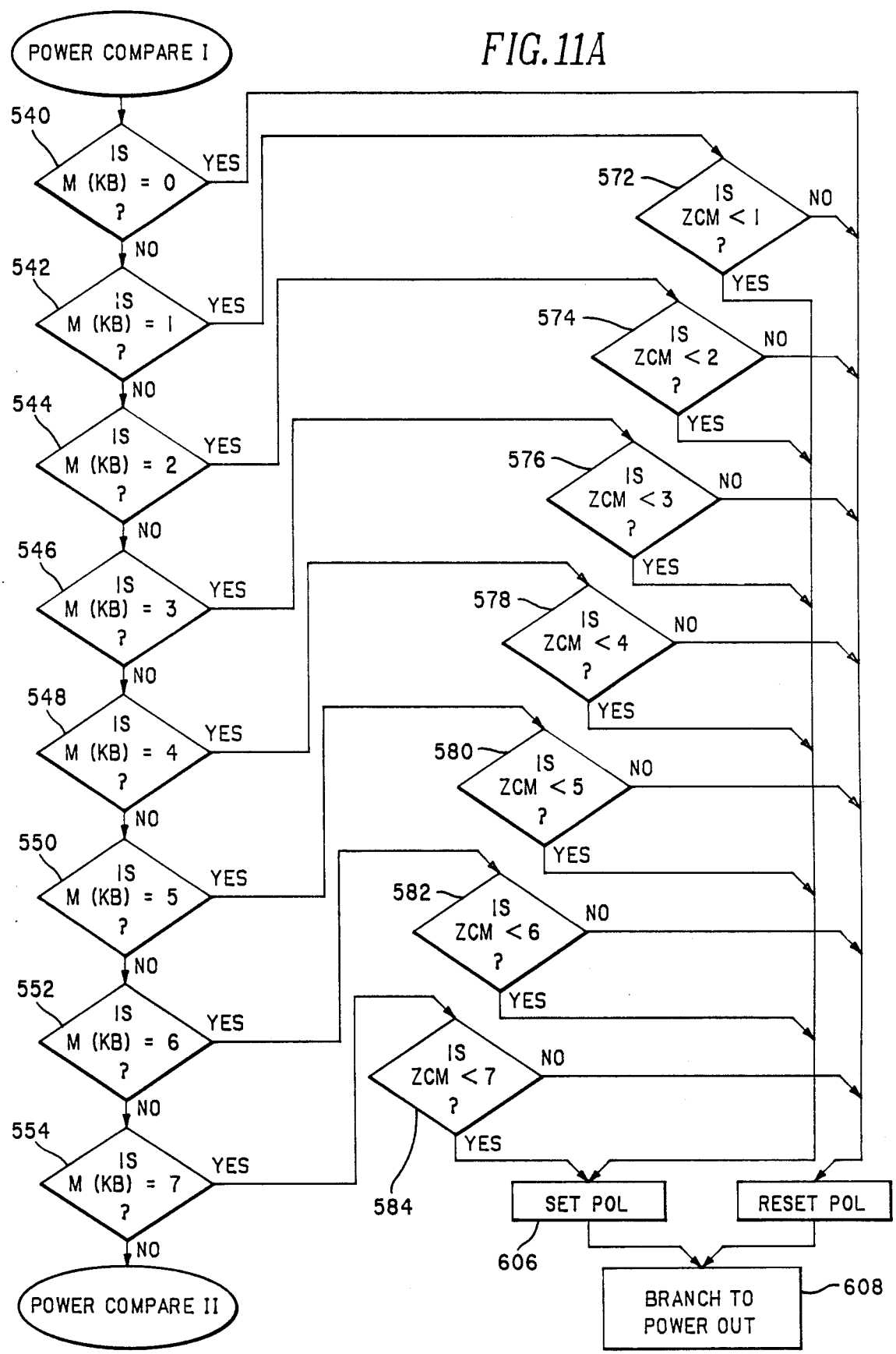
FIGS. 11A and 11B depict the flow diagram of the Power Compare routine incorporated in the control program for the microprocessor in the circuit of FIG. 5.

Referring now to the flow diagram of FIG. 9, Inquiry 382 checks for an OFF setting (KB=0). If OFF is selected, M(KB), the power control variable utilized in the Power Compare routine, is set to zero (Block 384) and the program branches (Block 386) to the Power Compare routine, FIG. 11A. Otherwise, Inquiry 388 determines if one of the Warm settings Wm(1) or Wm(2) corresponding to KB less than 3 has been selected (KB 3). If so, the program branches (Block 390) to the Warm routine, FIG. 12. Otherwise, Inquiry 392 compares the sensed utensil temperature SENOUT with the reference value representing the steady state temperature range for the selected heat setting, which is defined as (KB−1). For SENOUT greater then (KB−1), signifying that the sensed utensil temperature exceeds the selected range, Power Level zero is implemented (Block 384), and the program branches (Block 386) to the Power Compare routine (FIG. 11A).

If the sensed utensil temperature is not greater than the desired temperature range, Inquiry 394 determines if (KB−1) equals SENOUT signifying that the sensed utensil temperature is within the selected steady state temperature range. If so, the SS Flag is set (Block 396). By this arrangement the SS Flag is first set when the sensed temperature first reaches the selected steady state range signifying for power control purposes, the transition from the heat up phase to the steady state phase for surface unit 12. Once set, SS remains set unless the selected temperature setting is changed.

Next the appropriate error signal is determined. Inquiry 398 checks the state of the SS Flag to determine whether the surface unit is in the heat up phase (SS reset) or the steady state phase (SS set). If SS is reset, a first error signal (ERR) is computed (Block 400) as a function of the difference between the desired temperature range represented by (KB−1) and the sensed utensil temperature represented by SENOUT, by computing the difference between KB−1 and SENOUT and dividing this difference by two. If ERR1 equals a fraction, it is rounded off to the next larger integer. If the SS Flag is not set, a second error signal (also labeled ERR) is calculated. Inquiry 401 determines if SENOUT equals KB−1, signifying that the sensed utensil temperature is in the desired steady state range. If so, the error signal ERR is set to zero (Block 402). Otherwise, the second error signal is set equal to the difference between (KB−1) and SENOUT plus a constant 2 (Block 403). By this arrangement the error signal employed when operating in the steady state phase is at least a factor of two greater than the error signal employed when operating in the heat up phase under undershoot conditions, that is, when the sensed utensil temperature is lower than the selected steady state range. As will be apparent from the following description, this results in the surface unit being operated at a power level which is at least two levels higher in the steady state phase than in the transient heat-up phase during undershoot conditions except when the error signal would result in a level higher than the maximum level of 15. Since the SS Flag is reset in the User Input routine (FIG. 6) each time the user selected setting is changed, the first error signal computed in Block 400 is used following each change in power setting, until the SS Flag is again set as a result of the sensed utensil temperature first reaching the steady state temperature range for the newly selected heat setting.

After computing the error signal, Inquiries 404-410 determine the selected heat setting. A variable Y, corresponding to the steady state power level for the selected heat setting, is introduced in Blocks 412-420. The error signal (ERR) is summed with steady state power level variable Y to generate a signal representing the power level to be applied, which is temporarily stored in the accumulator (ACC) (Block 422). Inquiry 424 and Block 426 limit the maximum value to 15 in the event the sum of ERR+Y is greater than 15. The value stored in ACC is then transferred to M(KB) to implement the appropriate power level in the Power Compare routine and the program branches (Block 394) to the Power Compare routine (FIG. 11A).

To further speed the temperature response of the system in the Fry Mode, power level 15 is implemented when the sensed utensil temperature is less than 116° F. This is implemented by Inquiry 430 which checks the sensed utensil temperature. If the sensed utensil temperature is less than 116° F. (SENOUT=0), ACC is set to 15 (Block 426), resulting in M(KB) being set to 15(Block 428), and the program then branches (Block 394) to the Power Compare routine, FIG. 11A.

Figure 10:
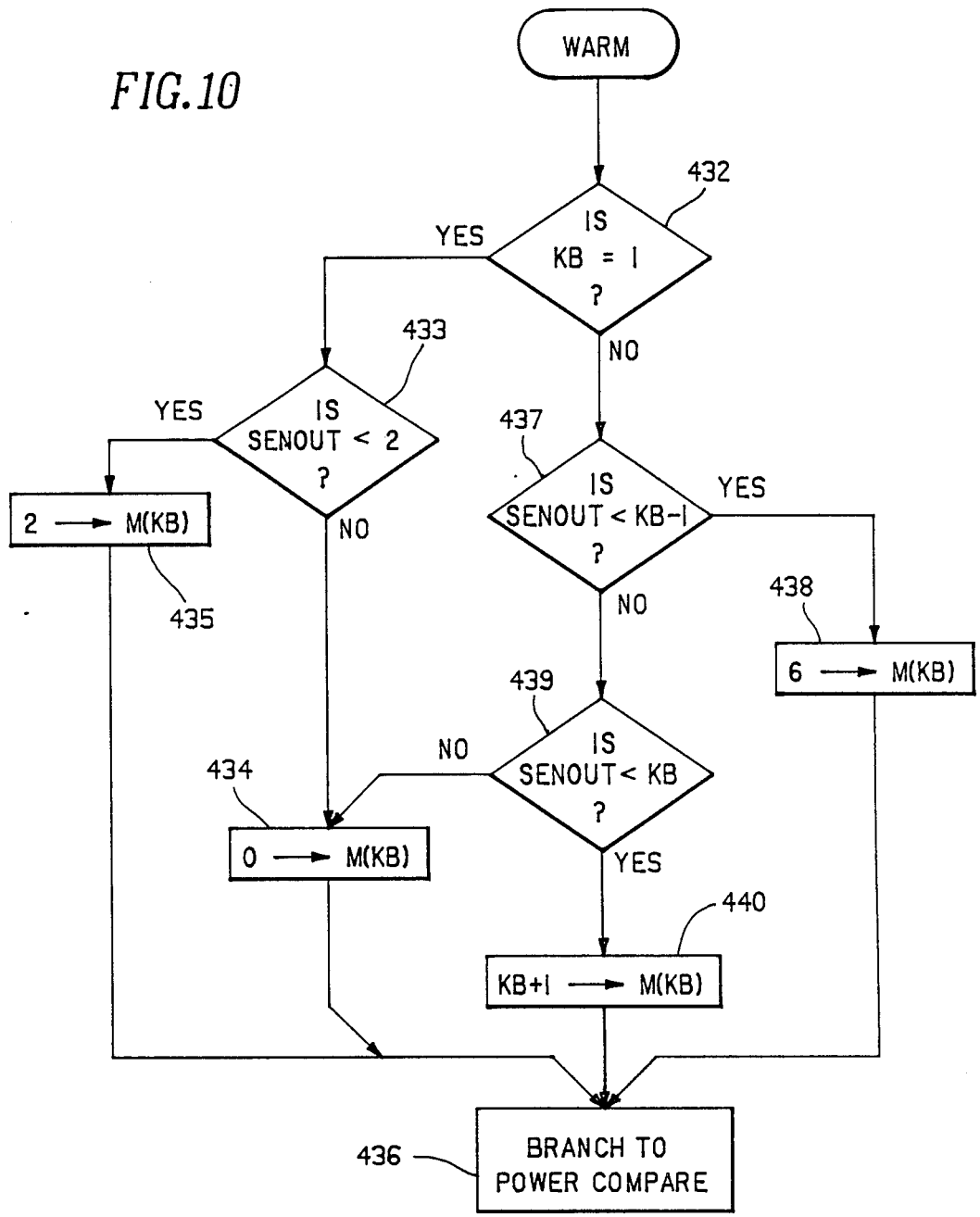
FIG. 10 is a flow diagram of the Warm routine incorporated in the control program of the microprocessor in the circuit of FIG. 5.

WARM Routine—FIG. 10

This routine is entered from the Fry routine whenever KB is less than 3. The function of this routine is to implement the Warm Mode.

For heat settings KB=1 and KB=2, the maximum warm temperature limit is 140° F. corresponding to SENOUT=2. For KB=3, the maximum warm temperature limit is 165° F. corresponding to SENOUT=3. Inquiry 432 checks for KB=1 representing the Wm(1) setting. For KB=1, Inquiry 433 determines if SENOUT is less than 2. If not, M(KB) is set to zero (Block 434) to de-energize the surface unit. If SENOUT is less than 2 signifying a sensed utensil temperature less than the maximum for KB=1, M(KB) is set to 2 (Block 435), and the program branches (Block 436) to the Power Compare routine (FIG. 11A).

Returing to Inquiry 432, if KB is not equal to one, Inquiry 437 determines if the sensed utensil temperature variable SENOUT is less than KB=1. If SENOUT is less than Kb−1, power level 6 is implemented by setting M(KB) to 6 (Block 438). The program then branches (Block 436) to the Power Compare routine (FIG. 11A).

If the sensed utensil temperature is not less than (KB−1), the program proceeds to Inquiry 439 which checks for the upper temperature limit for KB=2 and KB=3 which is represented by SENOUT=2, and 3 respectively.

If Inquiry 439 determines that the sensed utensil temperature is less than the maximum warm reference temperature for the selected heat setting (SENOUT<KB), M(KB) is set to (KB+1) (Block 440). This implements the steady state power levels 2, 3 and 4 for heat settings 1, 2 and 3, respectively, corresponding to duty cycles of 6.5%, 9% and 12.5%, respectively (See Tables I and II). If the sensed utensil temperature is not less than the maximum warm reference temperature, M(KB) is set to 0 (Block 434) corresponding to the zero or OFF power level. M(KB) having been set, the program then branches (Block 436) to the Power Compare routine (FIG. 11A).

Figure 11B:
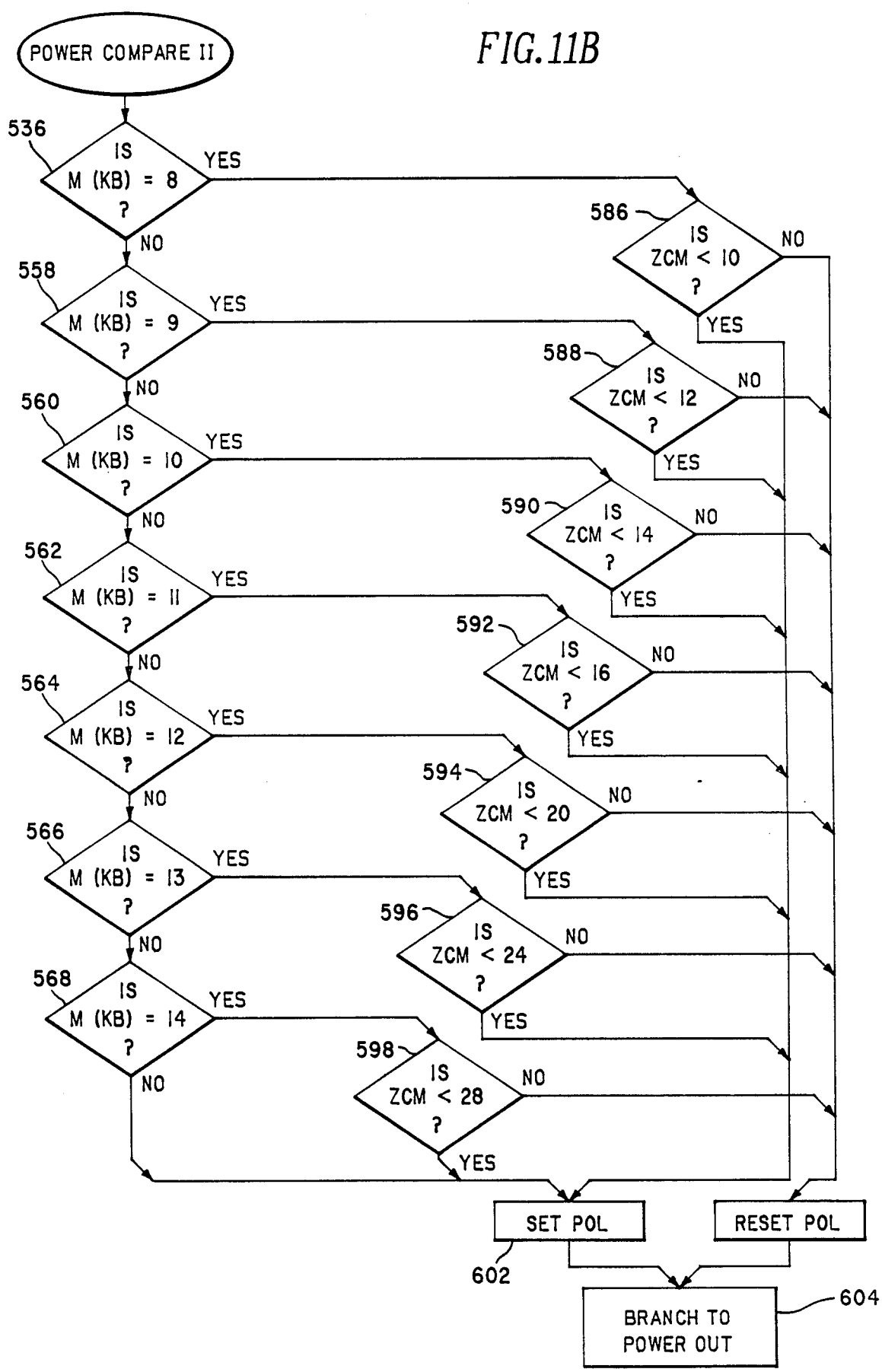

POWER COMPARE Routine—FIGS. 11A and 11B

The function of the Power Compare routine is to determine, based upon the power level designated by power level variable M(KB), whether or not the power control triac should be triggered into conduction for the next eight cycle control intervals.

It will be recalled that there are 16 possible power levels including OFF. The % duty cycle for each power level corresponds to the ratio of conductive control intervals to 32, the total number of control intervals in the control period. A ZCM counter functioning as a 32 count rign counter is incremented once for each pass through the control program. The power control decision is made by comparing the ZCM count with a reference count associated with the power level represented by M(KB). The reference count for each power level represents the number of conductive control intervals per control period corresponding to the desired duty cycle. When the ZCM count is less than the reference, a Power Out Latch (POL) is set, signifying that power control triac 82 is to be switched into conduction; otherwise, POL is reset, signifying that the associated power control triac is to be non-conductive.

Referring to FIGS. 11A and B, Inquiries 540–568 determine the value of M(KB). The appropriate one of Inquiries 572–598 corresponding to the identified M(KB) performs the comparison of ZCM to the associated reference count. If ZCM is less than the reference, the Power Out Latch is set by the appropriate one of Blocks 602 and 606, signifying that the surface unit for which the control program is presently executing is to be energized during the next control interval. Otherwise, the Power Out Latch is reset by the appropriate one of Blocks 604 and 608, signifying that associated surface unit is to be de-energized during the next control interval.

Figure 12:
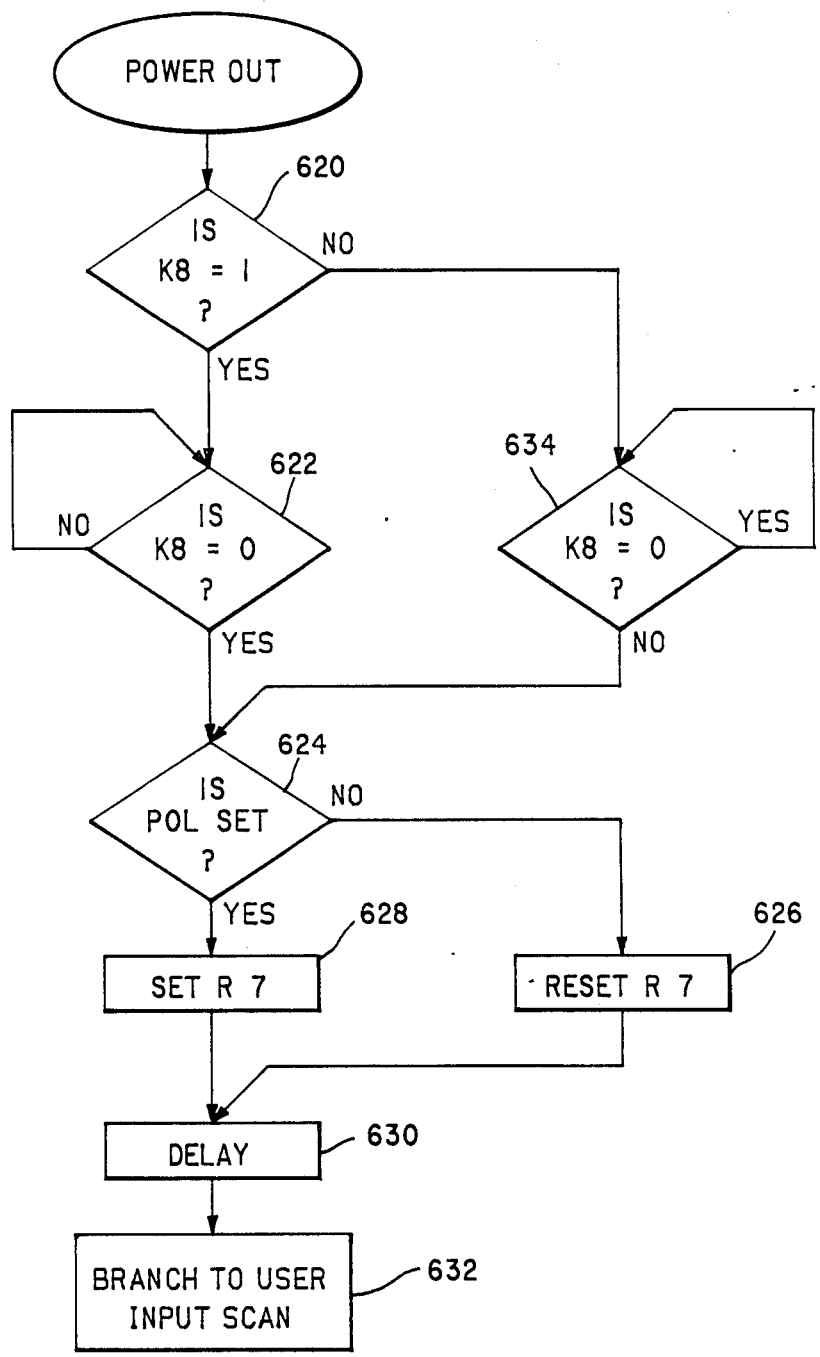
FIG. 12 is a flow diagram of the Power Out routine incorporated in the control program of the microprocessor in the circuit of FIG. 5.

Having made the power control decision, the program branches to the Power Out Routine, FIG. 12.

POWER OUT Routine—FIG. 12

The function of the Power Out routine is to synchronize the firing of power control triac 82 with zero crossings of the 60 Hz AC power signal applied across L1 and L2 (FIG. 5).

Referring now to FIG. 12, input port K8 receives zero crossing pulses from zero crossing detector circuit 100 (FIG. 5). Positive half-cycles are represented by K8=1 and negative half-cycles by K8=0. Inquiry 620 determines the polarity of the present power signal half-cycle. If the signal is presently in a positive half-cycle, (K8=1), Inquiry 622 waits for the beginning of the next negative half-cycle, (K8=0). Upon detection of K8=1, the program proceeds to Inquiry 624. If the answer to Inquiry 620 is NO (K8=0), Inquiry 634 waits for the beginning of the next positive half-cycle (K8=1), then proceeds to Inquiry 624.

Inquiry 624 checks the state of the Power Out Latch (POL). If POL is reset, signifying that surface unit 12 is not to be energized during the next control interval, output port R7 is reset (Block 626); if POL is set, signifying that the corresponding surface unit is to be energized, R7 is set (Block 628); the program delays (Block 630) and then returns (Block 632) to the Start Routine (FIG. 6) to repeat the control program for the next control interval.

To the illustrative embodiment, execution of the control program uses less than one-half cycle of the power signal. The duration of the control interval is eight cycles. Thus, Block 632 delays the program for 15 half-cycles and then returns (Block 634) to the User Input routine to begin execution for the next control interval.

While in accordance with the Patent Status, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In a cooking appliance of the type including at least one surface unit for supporting and heating a cooking utensil placed thereon and adapted for energization by an external power supply, temperature sensing means for sensing the temperature of a utensil supported on the surface unit, user operable input selector means enabling a user to select a FRY mode, and to select for the FRY mode one of a plurality of different heat settings, each heat setting having associated with it a predetermined steady state temperature range defined by a predetermined minimum and maximum temperature and electronic control means responsive to the temperature sensing means and the input means for controlling energization of the temperature sensing means and improvement wherein said electronic control means comprises:

means for establishing first and second error signals as functions of the difference between the sensed temperature and the selected steady state temperature range; and means operative to control energization of the surface unit as a function of the first error signal during the transient heat up phase prior to the sensed utensil temperature first reaching the steady state temperature range and as a function of the second error signal during the steady state phase after the sensed utensil temperature first reaches the steady state temperature range, whereby tighter control of the utensil temperature during the steady state phase is achieved while maintaining minimal overshoot in the transient heat up phase.

2. The improved control arrangement of Claim 1 wherein said first error signal is proportional to the difference between the selected steady state temperature range and the sensed utensil temperature and wherein said second error signal is larger than said first error signal.

3. The improved control arrangement of Claim 2 wherein said second error signal is at least a factor of two larger than said first error signal.

4. The improved control arrangement of Claim 1 wherein said electronic control means includes means for generating a first digital signal representing the steady state temperature range associated with the selected heat setting; means for generating a second digital signal representing the sensed utensil temperature, and wherein said first error signal is proportional to the difference between said first digital signal and said second digital signal and said second error signal is at least a factor of two larger than said first error signal.

5. In a cooking appliance of the type including at least one surface unit for supporting and heating a cooking utensil placed thereon and adapted for energization by an external power supply, temperature sensing means for sensing the temperature of a utensil supported on the surface unit, user operable input selector means enabling a user to select a FRY mode, and to select for the FRY mode one of a plurality of different heat settings, each heat setting having associated with it a predetermined steady state temperature range defined by a predetermined minimum and maximum temperature, and electronic control means responsive to the temperature sensing means and the input means for controlling energization of the surface unit, an improved power control arrangement wherein said control means is operative to generate a first error signal equal to one-half the difference between a signal representing the selected utensil temperature range and the signal representing the sensed utensil temperature range and a second error signal at least equal to the difference between the signal representing the selected utensil temperature range and the signal representing the sensed utensil temperature range, and wherein said control means is operative to control energization of the surface unit as a function of said first error signal prior to the sensed utensil temperature first reaching the selected steady state temperature range and as a function of said second error signal thereafter whereby the utensil temperature is rapidly brought to the selected steady state temperature range with minimal overshoot during the transient heat up phase and minimum undershoot during the steady state phase.

6. An improved method of controlling the energization of an automatic surface unit in a cooking appliance comprising the steps of:

at least periodically sampling the temperature of a utensil being heated by the surface unit and assigning it a value representative of a corresponding temperature range;

periodically computing a first error signal as a first function of the difference between a value representing the selected steady state utensil temperature range and a value representing the sensed utensil temperature range;

periodically computing a second error signal as a second function of the difference between the selected steady state utensil temperature range value and the sensed utensil temperature range value;

detecting when the sensed utensil temperature first reaches the selected steady state temperature range; and controlling energization of the surface unit as a function of the first error signal until the sensed utensil temperature first reaches the selected steady state range and as a function of the second error signal thereafter.

7. The method of Claim 6 wherein the first error signal is proportional to the difference between the selected steady state utensil temperature value and the sensed temperature value and the second error signal is greater than the first error signal by at least a factor of two.

* * * * *